US012789640B2

United States Patent
(12) United States Patent
Varisco et al.

(10) Patent No.: US 12,789,640 B2
(45) Date of Patent: Nov. 10, 2026

(54) CONTROL METHOD AND SYSTEM FOR HANDLING POWER/TORQUE OF AN ELECTRIC DRIVE MOTOR IN A VEHICLE

(71) Applicant: FERRARI S.P.A., Modena (IT)

(72) Inventors: Stefano Varisco, Modena (IT); Luigi Fiore, Modena (IT); Andrea Giacomini, Modena (IT); Alessandro Scamarcio, Modena (IT)

(73) Assignee: FERRARI S.P.A., Modena (IT)

( * ) Notice: Subject to any disclaimer, the term of this patent is extended or adjusted under 35 U.S.C. 154(b) by 13 days.

(21) Appl. No.: 18/735,732

(22) Filed: Jun. 6, 2024

(65) Prior Publication Data

US 2024/0416760 A1 Dec. 19, 2024

(30) Foreign Application Priority Data

Jun. 13, 2023 (IT) ........................ 102023000012039

(51) Int. Cl.
*B60L 15/10* (2006.01)

(52) U.S. Cl.
CPC ........... *B60L 15/10* (2013.01); *B60L 2240/24* (2013.01); *B60L 2250/26* (2013.01)

(58) Field of Classification Search
None
See application file for complete search history.

(56) References Cited

U.S. PATENT DOCUMENTS

2013/0158767 A1* 6/2013 Araki ........................ B60K 6/48 180/65.265
2016/0355177 A1* 12/2016 Varisco ............... B60W 30/045
2017/0101088 A1* 4/2017 Varisco ................. B60W 10/20
2020/0180601 A1* 6/2020 Björkman ................ B60K 6/48
2022/0340017 A1* 10/2022 Laaksonen .............. B60L 15/20

OTHER PUBLICATIONS

Italian Search Report in IT Application No. 202300012039 mailed Dec. 13, 2023, an English Translation attached hereto (9 pages).
Genesis_worldwide: "GV60 | Boost Mode | Genesis", Nov. 8, 2021 (Nov. 8, 2021), XP093111808, Retrieved from the Internet: URL:https://www.youtube.com/watch?v=dl0p9As30NI [retrieved on Dec. 13, 2023] * the whole document*.

* cited by examiner

*Primary Examiner* — Redhwan K Mawari
*Assistant Examiner* — Nada Mahyoob Alqaderi
(74) *Attorney, Agent, or Firm* — Leason Ellis LLP

(57) ABSTRACT

According to the disclosed control method, the power/torque, that can be supplied by an electric drive motor in a vehicle, is handled by setting and adjusting a maximum available level for the power/torque that can actually be supplied. The adjustment includes a reduction of the maximum available level from a peak value to a nominal value after the electric drive motor has supplied an actual power/torque equal to the peak value for a predetermined amount of time.

11 Claims, 2 Drawing Sheets

CONTROL METHOD AND SYSTEM FOR HANDLING POWER/TORQUE OF AN ELECTRIC DRIVE MOTOR IN A VEHICLE

CROSS-REFERENCE TO RELATED APPLICATIONS

This patent application claims priority from Italian patent application no. 102023000012039 filed on Jun. 13, 2023, the entire disclosure of which is incorporated herein by reference.

TECHNICAL FIELD

The invention relates to a control method for handling power/torque of an electric drive motor in a vehicle. In particular, the invention relates to a method for automatically handling a maximum available threshold or level for the power/torque that can actually be supplied by an electric motor, both in full electric vehicles and in hybrid vehicles, where one or more electric drive motors are associated with an internal combustion engine. More in particular, the invention advantageously applies not only to high-performance vehicles to be used on roads, but also—and especially—to track-suited and/or racing vehicles.

PRIOR ART

In those vehicles including at least one electric motor for driving the wheels, an electronic processing and control unit is provided, managing, instant by instant, the electric power supplied by the motor. More in detail, such electronic unit is configured by means of proper control logics, which establish a maximum available threshold or level that can be reached by the power and/or torque supplied by the electric motor.

Generally speaking, such maximum available level can be established also considering the operating conditions of the vehicle. In particular, such level can automatically be reduced as a function of the state of charge of the battery and/or of the thermal evolution of the electric and/or electronic components (battery, electric system, inverter, electric motors) that are provided in order to ensure the electric drive of the vehicle. As a consequence, the performances of the electric motor cannot always be evenly used by the driver, due to a variability in the operating conditions of the battery and of the other electric/electronic components associated therewith.

For example, if the state of charge of the battery decreases past a predetermined minimum level, the maximum available level for the power/torque that can be supplied decreases accordingly, so as to prevent an intensive use of the battery from causing a depletion of its charge in excessively short times.

As the same time, the electric/electronic components can reach critical temperature conditions, which are defined by design and can occur, for example, when such components are subjected to high electric currents for prolonged amount of times, despite the presence of suitable cooling systems. In this case, the algorithms used to configure the aforesaid electronic unit adjust the maximum available level for the power/torque that can be supplied so as to promptly reduce the value of such maximum level.

This reduction of the maximum available level in response to critical thermal conditions is imposed independently of the state of charge of the battery and it usually takes place in a totally unexpected manner for the driver.

Basically, because of this sudden reduction in the maximum available level for the power/torque than can be supplied, drivers become aware of this sudden and unexpected “cut” in the power supplied by the electric motor, when they actually request the maximum power/torque, namely by pressing the accelerator pedal all the way down (with an operating condition usually indicated as WOT, namely “wide open throttle”); this cut presents itself in an unforeseeable manner for drivers, since it is independent of the other driving actions and of the path on which the vehicle is travelling, so that it significantly and negatively affects driving feelings. Furthermore, this negative feeling due to the sudden and unexpected power decrease risks making drivers’ cognitive efforts very hard and/or risks distracting drivers from the actual driving.

While travelling along common road itineraries, where speed limits have to be respected, electric drive motors are evidently used very rarely at their full power for prolonged amount of times, so that these drawbacks hardly occur or only occasionally present themselves.

Whiles driving on a track, on the contrary, electric drive motors are used at the top of their potentialities, so that drivers can experience sudden and unexpected power/torque drops with a certain frequency.

Besides a negative impact on the driving, racing vehicles also suffer a damage in terms of performances (namely, in terms of lap times, for example during free practices or official practices with the press), since the imposed limitation tends to occur in the very moments in which the driver presses the accelerator all the way down in order to request a full power/torque drive, for example when exiting a bend or during an overtaking attempt.

In known solutions, the maximum available level for the power/torque that can be supplied by the electric drive motors is precautionarily and preventively reduced by a fixed and continuative quantity, for example a percentage reduction, relative to the actual and maximum potentialities. This preventive reduction limits the values of the electric current supplied to the electric drive motors and, hence, slows down temperature increases in such components. It basically is as if the electric drive motors were “depowered”, in order to preserve the different electric/electronic components dedicated to the electric drive. FIG. 1 schematically shows this type of known solutions: the maximum available level established by the control logics is represented with a broken line and, except for possible reductions due to the state of charge of the battery, it remains constant. During power/torque requests caused by the activation of the accelerator pedal, the actual supplied power (shown with a solid line) cannot go beyond this constant maximum level.

This solution is not anyway satisfactory for racing vehicles, since it prevents the driver form exploiting the electric drive motors at their full potentials and reduces the performances of the vehicle in an indiscriminate manner. Moreover, this solution does not always prevent the electric/electronic components from reaching anyway critical temperature conditions (and, hence, it does not always prevent the driver from having to face unexpected power/torque drops when the accelerator is pressed all the way down).

Therefore, the object of the invention is to solve the problems discussed above, preferably in a simple and/or effective and/or economic manner, for example by defining an ideal compromise that allows for high performance levels, avoids excess thermal stresses of the electric/electronic components used for the electric drive and avoids unexpected power drops for the driver.

SUMMARY OF THE INVENTION

The aforesaid object is reached by a control method and system for handling power/torque of an electric drive motor in a vehicle, as defined in the present claims, and by a vehicle, as defined in the claims.

The dependent claims, furthermore, define special embodiments of the invention with a non-limiting character.

BRIEF DESCRIPTION OF THE DRAWINGS

The invention will be best understood upon perusal of the following description of preferred embodiments, which is provided by mere way of non-limiting example and with reference to the accompanying drawings, wherein.

DETAILED DESCRIPTION OF PREFERRED EMBODIMENTS OF THE INVENTION

Figure 2:
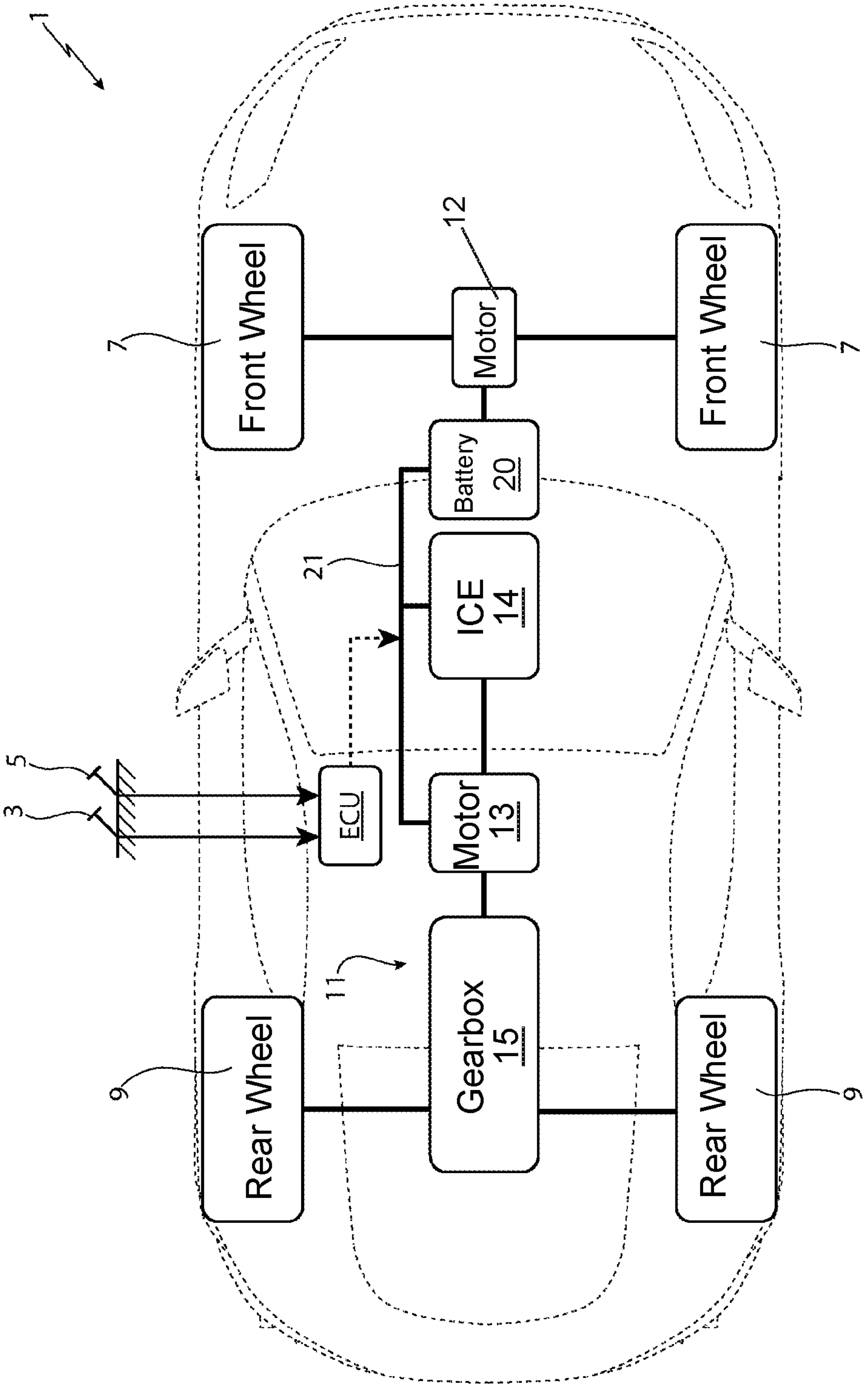
FIG. 2 is a diagram of an illustrative vehicle, which implements the control method according to the invention for handling the power/torque of an electric drive motor installed in the vehicle.

In FIG. 2, reference number 1 indicates a schematically shown vehicle having a cockpit (not shown) configured so as to accommodate a driver. Such cockpit, which is of the known kind and, hence, is not described in detail, is provided with control members for driving the vehicle, which are also known. In particular, the cockpit is provided with a brake pedal 3 and with an accelerator pedal 5.

The vehicle 1 further comprises two front wheels 7 and two rear wheels 9. In the specific example discussed herein, all wheels 7 and 9 are drive wheels.

The wheels 7 and 9 are operated by a powertrain system 11 comprising at least one electric drive motor. In the specific solution disclosed herein, the powertrain system 11 comprises two electric drive motors, indicated with reference numbers 12 and 13 and associated with the operation of the front wheels 7 and of the rear wheels 9, respectively.

In the specific example discussed herein, the powertrain system 11 also comprises an internal combustion engine 14, for example a turbocharged petrol engine, which supplies torque to the wheels 9 together with the electric motor 13. Therefore, the torque supplied by the internal combustion engine 14 and the one supplied by the electric motor 13 add up (or can also be used independently of one another for driving the wheels 9), according to known techniques that are not described in detail. In particular, the internal combustion engine 14 and the electric motor 13 operate the wheels 9 by means of a gearbox 15. The electric motor 12, on the other hand, operates the wheels 7 in a dedicated manner, with a fixed gear ratio.

For example, the internal combustion engine 14 is located in a rear area of the vehicle 1, taking into account a longitudinal travel direction of the vehicle 1, and is transversely located in a substantially central position.

The vehicle 1 further comprises at least one known battery 20, a so-called high-voltage battery, connected to the electric motors 12 and 13 by means of an electric/electronic system 21, of the known kind and not described in detail, having features that are such as to exchange electrical energy in both directions (namely, to power the electric motors 12 and 13 and to transfer a charging current to the battery 20 when the electric motors 12 and 13 work as alternators, for example during phases of electric braking of the wheels 7,9).

The vehicle 1 further comprises an electronic processing and control unit, which is indicated by ECU in FIG. 2 and is configured, by means of proper algorithms, to adjust some functions of the vehicle 1. As described more in detail hereinafter, the ECU is configured to set and adjust a maximum available threshold or level for the torque and/or power that can actually be supplied by the electric motors 12 and 13 (in addition to the one delivered by the internal combustion engine 14, in the specific case in which the vehicle is a hybrid vehicle).

The ECU can basically consist of one single electronic board or it can be defined by several electronic boards communicating with one another via a data communication network, for example a common CAN network provided in the vehicle 1.

The architecture described above for the vehicle 1 with reference to FIG. 2 is provided by mere way of example, since the invention can also apply to other types of vehicles, both hybrid and full electric vehicles. For example, it can apply to rear-wheel drive vehicles or to front-wheel drive vehicles (instead of four-wheel drive vehicles, like the one shown herein) and it can apply to vehicles with two wheels (namely, electric or hybrid motorcycles).

The description below relates to the sole electric motor 13, provided that the same considerations also apply to the electric motor 12 (and to other electric drive motors the vehicle can be equipped with).

Figure 3:
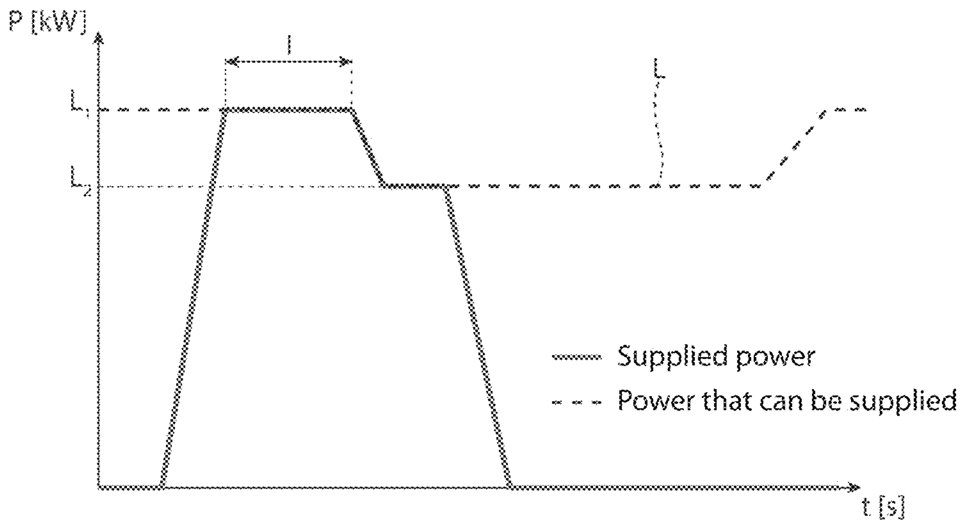
FIG. 3 is similar to FIG. 1 and relates to a preferred embodiment of the control method according to the invention.

The ECU is configured, by means of proper algorithms, so as to handle the power/torque supplied by the electric motor 13 and, as mentioned above, so as to set a maximum available threshold or level L (shown with a broken line in FIG. 3) for such power/torque; the maximum available level L basically consists of a cap that cannot be exceeded by the power/torque actually supplied by the electric motor 13 (shown with a solid line in FIG. 3).

Like in the prior art, the ECU preferably receives signals containing information indicative of the temperature of electric and electronic components involved in the electric drive (namely, the temperature of the battery 20 and/or of the electric motor 13 and/or of the system 21), besides information indicative of the temperature of the internal combustion engine 14. Such information is monitored by the ECU in order to carry out a closed-loop control, of the known kind and not described in detail, which is aimed at limiting the value of the maximum available level L so as to ensure that the temperature of the aforesaid electric/electronic components does not exceed at least one threshold value predefined by design and indicative of a critical thermal condition.

At the same time, the ECU preferably receives signals containing information indicative of the state of health of the battery 20 (thermal state, state of charge, possible deterioration of the component, etc.) and monitors such information in order to perform a closed-loop control, of the known kind and not described in detail, which is aimed at limiting the value of the maximum available level L so as to manage the residual charge and avoid deteriorations of the battery 20 in an effective manner.

As a consequence of these possible limitations, the maximum available level L can change over time.

With reference to FIG. 3 and according to an aspect of the invention, the maximum available level L is adjusted over time based on control logics that allow for the use of overboost power levels, though continuing monitoring the thermal state of the components and the state of charge of the battery 20.

Thanks to these control logics, the maximum available level L is adjusted by the ECU between a peak value (or overboost level) L1 and a nominal value L2, which is smaller than the value L1, so as to ensure a full availability of power/torque that can be supplied up to the value L1 only for an amount of time I, which is predefined and is established by design. Once the amount of time I has elapsed, the ECU adjusts the maximum available level L so as to reduce it to the value L2.

Preferably, the amount of time I is independent of the state of charge of the battery 20 and/or is independent of the temperature of the electric/electronic components and/or is independent of the operating driving conditions of the vehicle 1 and/or is independent of the path covered by the vehicle 1.

More preferably, the amount of time I is a constant fixed value (for example, established by design and stored in a memory of the ECU).

Similarly, preferably, the difference between the values L1 and L2 is independent of the state of charge of the battery 20 and/or is independent of the temperature of the electric/electronic components and/or is independent of the operating driving conditions of the vehicle 1 and/or is independent of the path covered by the vehicle 1.

More preferably, the difference between the values L1 and L2 is a constant fixed value (for example, established by design and stored in the aforesaid memory).

This reduction of the maximum available level L from the value L1 to the value L2 leads to a reduction of the power/torque actually supplied by the electric motor 13 during a request for full power/torque of the driver and is directly correlated with a limitation of the electric currents supplied for the electric drive, with the aim of slowing down the temperature increases of the electric/electronic components.

The setting and adjustment of the maximum available level L carried out by the ECU affect the supply of power to the electric motors by an inverter device of such system 21 according to techniques that can be different from one another.

In particular, the ECU stores several maximum torque curves with and without overboost respectively (for example, also associated with limits of maximum power than can be supplied by the battery); when the overboost is active (namely, at the value L1), the movement of the accelerator pedal is associated with torque curves with active overboost, so that the inverter receives a corresponding torque request and supplies the electric motors so as to fulfil such request. Similarly, when the overboost is deactivated (namely, at the value L2), the movement of the accelerator pedal is associated with the torque curves without overboost, so that the inverter receives a smaller torque request and operates accordingly.

As mentioned above, the extent of the amount of time I and the extent of the reduction from the value L1 to the value L2 are determined by design, trying to find the best compromise between the needs to limit thermal stresses, fully exploit the potentialities of the electric motor 13 when the driver requests a full power/torque through the accelerator pedal 5, in order to obtain high performances.

This search for the best compromise can be performed by means of a series of software simulations and/or by means of experimental tests and/or by means of statistical evaluations, since the result depends on the features of the vehicle and on the applications for which the vehicle is designed. For example, the amount of time I can range from 2 to 5 seconds and the drop to the value L2 from the value L1 can range from 5% to 20%.

Therefore, with reference to FIG. 3, the electric motor 13 supplies the power/torque that was requested by the driver through the accelerator pedal 5, until the value of the maximum available level L that was set, at most, is reached. More in detail, when the driver requests a full power/torque to the electric motor 13, for example by pressing the accelerator pedal 5 all the way down, the actually supplied torque/power (shown with a solid line) reaches the value L1 and remains at such value L1 only for the amount of time I; once this amount of time has elapsed, the ECU automatically reduces the maximum available level L to the value L2, so that the actually supplied power/torque also decreases to the value L2. After that, even if the driver keeps pressing the accelerator pedal 5 all the way down up to a braking (which takes place, for example, when the vehicle is about the enter a following bend), the maximum available level L and, hence, the actually supplied power/torque remain at the value L2.

In the example of FIG. 3, the ECU does not carry out other possible adjustments of the maximum available level L due to a possible achievement of critical thermal conditions and/or to a possible achievement of a minimum charge threshold of the battery 20. Nevertheless, as mentioned above, the state of charge of the battery 20 and the temperature of the electric/electronic components keep being monitored.

Specifically, FIG. 3 shows, in a hypothetical track lap, an acceleration that leads to a supply of torque/power at the value L1, namely at the peak value, in response to a request for full power/torque (for example, by pressing the accelerator pedal 5 all the way down), for example at the exit from a bend; as mentioned above, the power/torque peak can only be used for the amount of time I.

After having taken advantage of the power/torque peak for the amount of time I and after the consequent reduction to the value L2, the ECU automatically restores the value L1, starting from the value L2, in response to a consent, which is automatic, namely is not handled or emitted by the driver.

Preferably, such consent and, hence, the restoration of the value L1 occur when the ECU detects/identifies/predicts a new exit from a bend along the path on which the vehicle 1 is travelling.

More preferably, the exit from the bend is detected/identified/predicted solely starting from the activation of the pedals 3 and 5, namely from signals detected by sensors and indicative of the position and/or of the speed of the pedals 3 and 5 (namely, without considering other input signals). By mere way of example, the exit from the bend is detected/identified/predicted when the accelerator pedal 5 is pressed by the driver immediately after a release of the brake pedal 3, if necessary together with the exceeding of a given threshold for the movement of the accelerator pedal 5 (for instance, a movement all the way down).

If necessary, the control logic assigned to detecting/identifying the exit from the bend and to emitting the aforesaid consent can also take into consideration other factors or parameters, such as the activation speed of the accelerator pedal 5 and/or the release speed of the brake pedal 3 and/or an activation threshold for the brake pedal 3, etc.

Generally speaking, the exit from a bend can be detected/identified/predicted by means of other techniques, namely taking into account other factors or parameters, in combination with, or alternatively to, the activation of the pedals 3 and 5; for example, such control logic can take into consideration signals concerning the steering angle of the steering wheel and/or position signals of the vehicle 1 (for example, a GPS signal) and/or signals emitted by video cameras, lidars, radars, etc., if mounted on the vehicle 1.

More in general, the control logic assigned to emitting the consent, which automatically restores the value L1, can be set based on several factors, alternatively or in addition to the exit from a bend. For instance, such control logic can be defined so as to detect/identify/predict other operating conditions (for example, an overtaking attempt), which require the full availability of power/torque; and/or so as to keep the value L2 for a further predefined amount of time, before automatically switching to the value L1.

The control logic described above, which keeps the power/torque supplied by the electric motor 13 at the value L1 for a predetermined amount of time I, reaches relatively high acceleration values on a track, with a gain in terms of performances compared to known solutions.

The fact of limiting the time of the power/torque peak does not basically compromise performances to a significant extent, since it allows the overboost to be used when there is a significant gain in performances. As a matter of fact, further maintaining the available power/torque at the value L1 would not lead to a significant advantage in terms of accelerations and/or speed; on the other hand, it would advance the achievement of critical thermal conditions (with a consequent sudden and unexpected intervention, which "cuts" the maximum available level L to a lower level in order to preserve the electric/electronic components).

Figure 1:
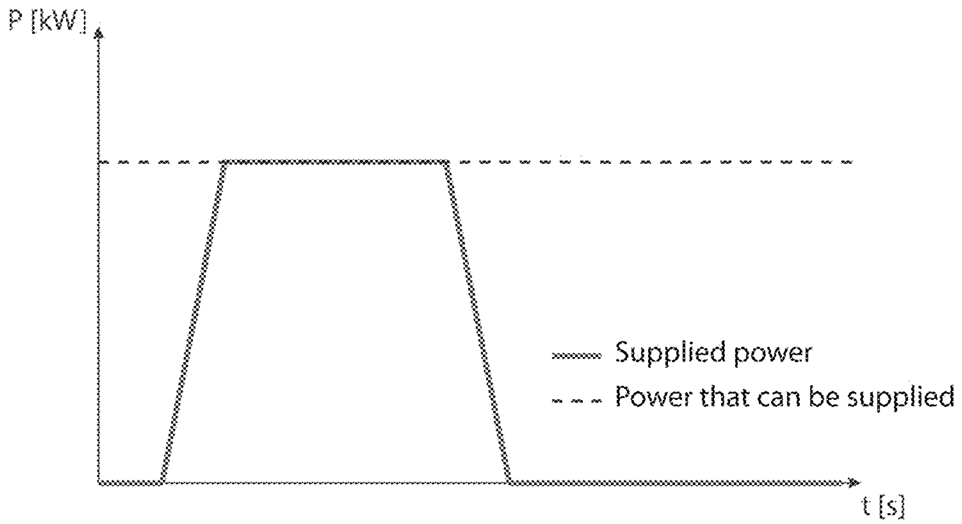
FIG. 1 is a diagram showing, in a simplified manner, the setting of a maximum available level with a constant value for managing the torque/power of an electric drive motor, according to the prior art described above.

In particular, by means of a proper adjustment of the amount of time I and of the extent of the reduction to the value L2 (L1–L2) during the designing phase, the power peaks are made available for a predefined number of times, so as to maintain a constant performance for an expected number of laps. If necessary, after having made the power/torque peak (L1) available for a predefined number of times, the ECU could be configured to set the maximum available level L to a constant reduced value, like in the known solution of FIG. 1.

Furthermore, the fact of making power/torque peaks (overboost) available right at the exits of bends involves the selection of an event that is extremely significant in obtaining high performances. In other words, the availability of power/torque peaks is not indiscriminate, in order to protect the electric/electronic components from thermal stresses with an ideal compromise. At the same time, the thermal evolution of the components is anyway monitored, so that a power/torque drop is imposed also in the claimed solution when the temperature exceeds predetermined thresholds, but such decrease takes place after having taken advantage of the electric drive in an efficient manner.

At the same time, the reduction of the supplied power/torque from the value L1 to the value L2 is not unexpected for the driver, since it is predetermined by design and, in addition, is constant is its manifestation; in other words, the driver is perfectly aware that, when the amount of time I finishes, the vehicle 1 will experience a power/torque reduction.

To this regard, the cockpit can advantageously be provided with a control panel that receives data from the ECU and provides the driver with information in real time, displaying it on a display, concerning the available power/torque value and/or concerning the reduction thereof and/or concerning the intervention times provided in the ECU. The driving feeling can significantly be improved compared to known solutions also thanks to this information.

Further advantages are evident for a person skilled in the art based on the information disclosed above.

Finally, the control system and method described with reference to the accompanying figures can clearly be subjected to changes and variants, though without going beyond the scope of protection defined by the appended claims.

In particular, as mentioned above, the extent of the amount of time I and/or the extent of the reduction to the value L2 and/or the consent that restores the value L1 could be defined in a different manner from the one indicated in the examples discussed above.

Finally, the invention could also apply to self-driving vehicles, namely driverless vehicles, or to remotely driven vehicles.

The invention claimed is:

1. A control method carried out by an electronic processing and control unit of a vehicle for handling power/torque of an electric drive motor in the vehicle, the method comprising the step of setting and adjusting a maximum available threshold for an actual power/torque that is able to be supplied by said electric drive motor in response to a full power/torque request made by a driver of said vehicle through an accelerator pedal of said vehicle; the adjustment comprising a reduction of said maximum available threshold from a peak value to a nominal value;

wherein said maximum available threshold is reduced from said peak value to said nominal value when the electronic processing and control unit determines said electric drive motor has supplied an actual power/torque equal to said peak value for a time in response to the full power/torque request made by the driver;

wherein the adjustment comprises an automatic restoration of said peak value starting from said nominal value in response to a control logic automatically emitting a consent when: 1) detecting, identifying, or predicting an exit of the vehicle from a bend along a path on which said vehicle is travelling and/or 2) detecting, identifying, or predicting an overtake attempt.

2. The method according to claim 1, wherein the driver is provided, in real time and on a display, with information concerning said maximum available threshold and/or concerning a reduction from said peak value to said nominal value and/or concerning intervention times to be expected for said reduction.

3. The method according to claim 1, wherein said electric drive motor is powered with electric current generated by a battery having a state of charge; and wherein said time is independent of said state of charge.

4. The method according to claim 3, wherein the reduction from said peak value to said nominal value has an extent that is independent of said state of charge.

5. The method according to claim 1, wherein said electric drive motor is powered with an electric current that causes a temperature increase in electric/electronic components provided in said vehicle; and wherein said time is independent of said temperature increase.

6. The method according to claim 5, wherein the reduction from said peak value to said nominal value has an extent that is independent of said temperature increase.

7. The method according to claim 1, wherein said time is defined by a constant value.

8. The method according to claim 1, wherein said exit of the vehicle from the bend is detected, identified, or predicted in response to signals indicative of activations of the accelerator pedal and of a brake pedal provided in said vehicle.

9. The method according to claim 8, wherein said exit of the vehicle from the bend is detected, identified, or predicted exclusively in response to the signals of said accelerator pedal and brake pedal.

10. A control system for handling power/torque of the electric drive motor in the vehicle, the system comprising the electronic processing and control unit configured so as to carry out the control method according to claim 1.

11. The vehicle comprising:

at least one drive wheel, the electric drive motor to operate said at least one drive wheel, a battery to store power, an electric/electronic system, which connects said battery to said electric drive motor, and the electronic processing and control unit, which controls said electric/electronic system and/or said electric drive motor and is configured so as to carry out the control method according to claim 1.

* * * * *